United States Patent

Toyomoto

[11] Patent Number: 5,964,556
[45] Date of Patent: Oct. 12, 1999

[54] FLANGE AND TAPER SIMULTANEOUS FIT ROTARY TOOL HOLDER

[75] Inventor: Hiromitsu Toyomoto, Daito, Japan

[73] Assignee: Richmill USA, Inc., Sante Fe Springs, Calif.

[21] Appl. No.: 09/098,508

[22] Filed: Jun. 17, 1998

[51] Int. Cl.⁶ .................................................. B23C 9/00
[52] U.S. Cl. ...................... 409/234; 408/239 A; 409/232
[58] Field of Search .................................. 409/232, 234; 279/143, 145; 408/238, 239 A

[56] References Cited

U.S. PATENT DOCUMENTS

| | | | |
|---|---|---|---|
| 3,136,217 | 6/1964 | Swanson et al. | 409/232 |
| 3,554,080 | 1/1971 | Herrmann | 408/238 |
| 4,714,389 | 12/1987 | Johne | 408/240 |
| 4,840,520 | 6/1989 | Pfalzgraf | 409/232 |
| 4,886,402 | 12/1989 | Pfalzgraf | 409/234 |
| 5,030,047 | 7/1991 | Pfalzgraf | 409/234 |
| 5,716,173 | 2/1998 | Matsumoto | 408/239 A |

FOREIGN PATENT DOCUMENTS

| | | | |
|---|---|---|---|
| 263484 | 1/1989 | Germany | 408/239 A |

*Primary Examiner*—Daniel W. Howell
*Attorney, Agent, or Firm*—Howrey & Simon

[57] ABSTRACT

A device for holding and securing a rotating tool to be attached to the spindle shaft of a machine tool, that can realize ultra-precise cutting or grinding work under conditions of high rotation speed and rapid feeding. A tool holder consists of an outer cylinder having a tapered outside peripheral surface which comes into contact with the inside peripheral surface in a tapered hole of a spindle shaft; an inner cylinder which fits in such a manner that the outer cylinder can slide in an axial direction; a retainer having an outer armor which is formed at the front end of the inner cylinder and can contact the top end of said spindle shaft; and an elasticity-accelerating member which imparts elastic force to the retainer such that the outer cylinder can move towards its base end.

16 Claims, 7 Drawing Sheets

Fig. 8 understand# FLANGE AND TAPER SIMULTANEOUS FIT ROTARY TOOL HOLDER

BACKGROUND OF THE INVENTION

1. Field of the Invention

The present invention relates to a tool holder, and more particularly a rotary tool holder for holding a rotating tool.

2. Description of Related Art

Figure 8:
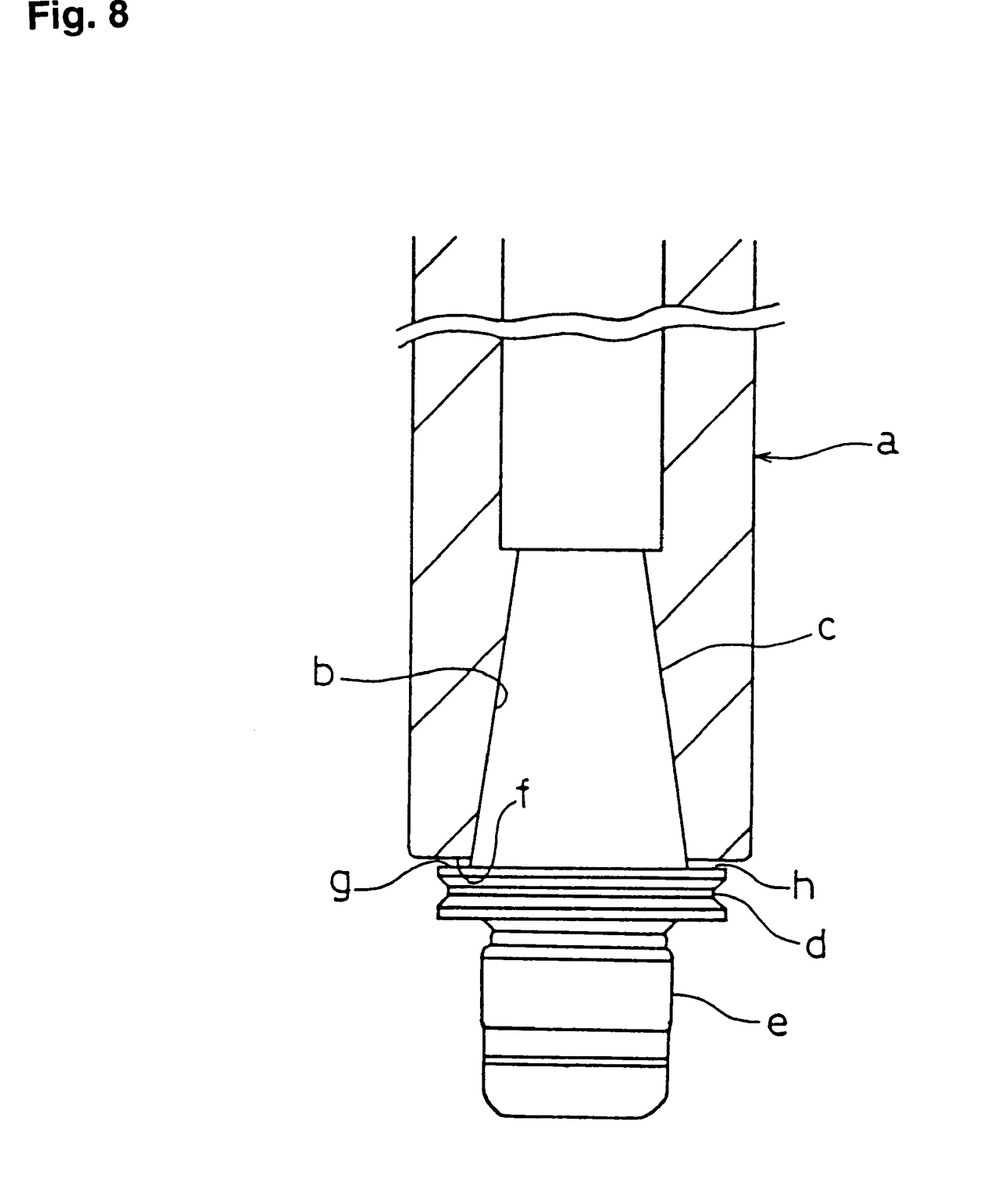
FIG. 8 is an illustration showing the conventional rotary tool holder.

The known conventional rotary tool holder for holding rotating tools, which is installed on the spindle shaft of a machine tool, is a single-piece construction consisting of a tapered area c that contacts the inside peripheral surface b of a tapered hole in a spindle shaft a, an outer armor d at the top end of said spindle shaft a, and a tool attaching area e at the top end of the outer armor d, as shown in FIG. 8.

The conventional rotary tool holder as described above has the problem that a minute gap is created between the front end f of the spindle shaft a and the base end g of the outer armor d. Furthermore, even if the accuracy in the dimensions is improved in order to ensure that the front end f of the spindle shaft a comes into contact with the base end g of the outer armor d, it is difficult to maintain full contact between the components due to tolerances. For this reason, the installation accuracy of the rotary tool holder on the spindle shaft a is low, which makes the rotary tool holder unable to perform extremely precise cutting work required under conditions of high rotation speed and rapid workpiece feeding.

SUMMARY OF THE INVENTION

It is an object of an embodiment of the present invention to provide a tool holder that solves the above-mentioned problems and realizes ultra-precise cutting or grinding work under conditions of high rotation speed and rapid workpiece feeding.

It is another object of the embodiment of the present invention to provide a rotary tool holder having an outer cylinder having a tapered outside peripheral surface which contacts the inside peripheral surface in a tapered hole of a spindle shaft; an inner cylinder which fits in such a manner that said outer cylinder can slide in the axial direction; a retainer having an outer armor which is formed at the front-end of said inner cylinder and at the same time contacts the top end of said spindle shaft; and an elasticity-accelerating member which imparts elastic force to said retainer so that said outer cylinder moves towards its base end.

In a preferred embodiment of the present invention, the dimensions are set to 1.5 D≦L≦2.5 D wherein D is the maximum diameter and L is the axial length of the outer cylinder.

In a still preferred embodiment of the present invention, the elasticity-accelerating member consists of multiple disc springs, and said disc springs are fitted in the inner cylinder of the retainer.

Furthermore, it is desirable that the inside peripheral surface of the outer cylinder consists of a small-diameter inside peripheral surface and a large-diameter inside peripheral surface, and that a small-diameter outside peripheral surface and a large-diameter outside peripheral surface are formed in the inner cylinder of the retainer in such a manner that they contact the small-diameter inside peripheral surface and the large-diameter inside peripheral surface of said outer cylinder and freely slide in the respective axial directions. It is also desirable that the mutually-opposed No. 1 or first concavity and No. 2 or second concavity are formed at a circumferentially specified pitch on the inside peripheral surface of the outer cylinder and the outside peripheral surface of the retainer, and that rotation-stopping balls are installed between said No. 1 or first concavity and No. 2 or second concavity. Additionally, a ring-shaped No. 1 or first spacer is installed at the position where the elasticity-accelerating member is accepted, and a No. 2 or second spacer with an inverted- L-shaped cross section is installed at the top end of the inner cylinder.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

Preferred embodiments of the present invention will be described with reference to the accompanying drawing wherein.

DETAILED DESCRIPTION OF EMBODIMENTS

Embodiments of the present invention will be described in detail with reference to the accompanying drawings.

Figure 1:
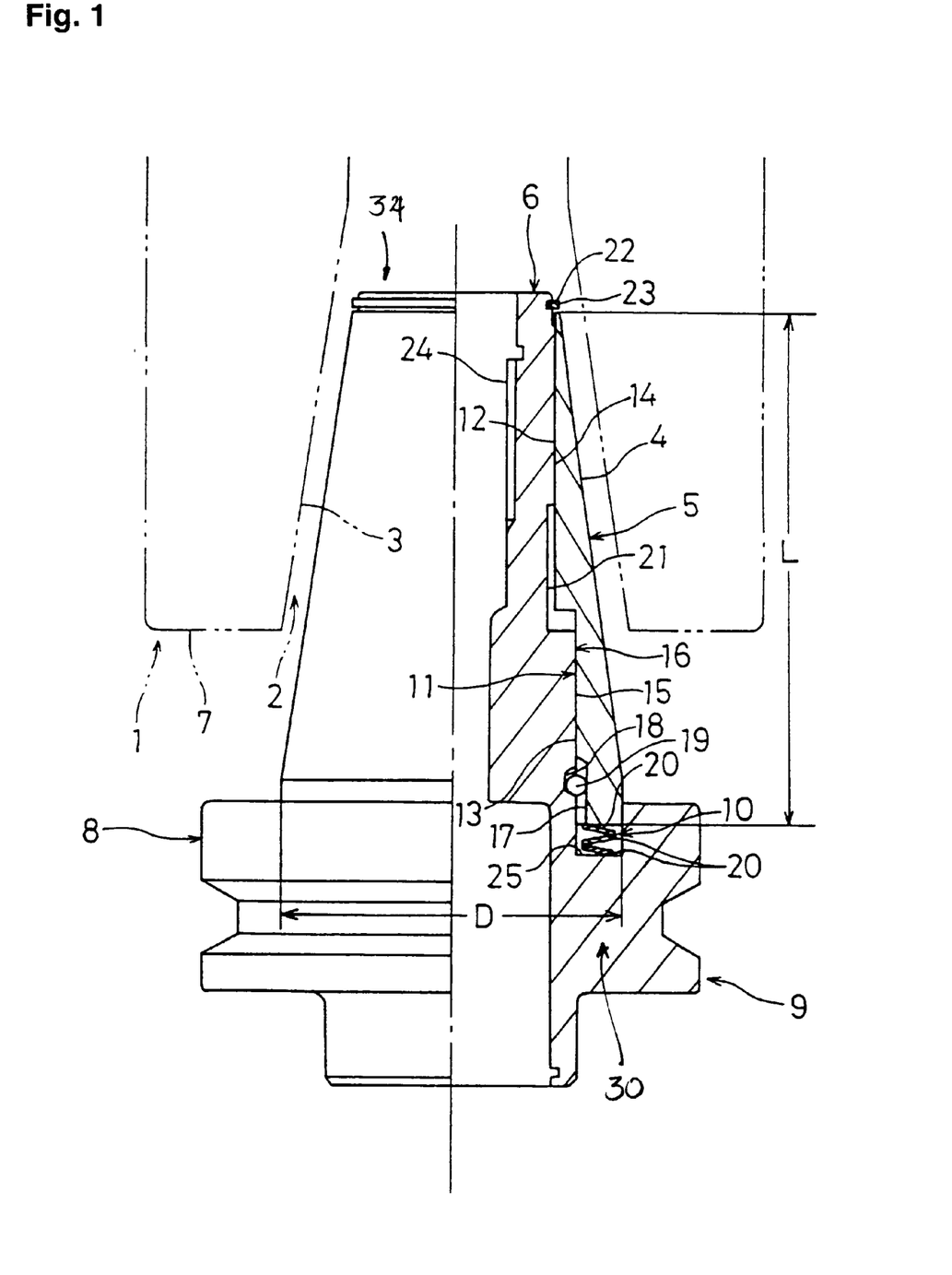
FIG. 1 is a horizontal sectional view of a rotary tool holder in accordance with an embodiment of the present invention.

FIG. 1 shows a flange and taper simultaneous fit rotary tool holder (herein after referred to as a rotary tool holder) in accordance with an embodiment of the present invention. The rotary tool holder consists of an outer cylinder 5 having a tapered outside peripheral surface 4 which comes into contact with the inside peripheral surface 3 in a tapered hole 2 of a spindle shaft 1; an inner cylinder 6 having a first end 30, which fits in such a manner that the outer cylinder 5 slides in the axial direction; a retainer 9 having an outer arm 8 which is formed at the first end 30 of the inner cylinder 6 and contacts the first end 7 of the spindle shaft 1; and an elasticity-accelerating member 10 which imparts elastic force to the retainer 9 so that said outer cylinder 5 moves towards its second base end 34.

The inside peripheral surface 11 of the outer cylinder 5 consists of a small-diameter inside peripheral surface 12 and a large-diameter inside peripheral surface 13. The maximum diameter D and the axial length L of the outer cylinder 5 are set such that 1.5 D≦L≦2.5 D. Furthermore, a small-diameter outside peripheral surface 14 and a large-diameter outside peripheral surface 15, which freely slide in the respective axial directions and contact the small diameter inside peripheral surface 12 and the large-diameter inside peripheral surface 13 of the outer cylinder 5, are formed in the inner cylinder 6 of the retainer 9. More specifically, the outside peripheral surface 16 of the inner cylinder 6 consists of said large-diameter outside peripheral surface 15 at the first end, the small-diameter outside peripheral surface 14 at the second end, and a circumferential clearance groove 21 between the large-diameter outside peripheral surface 15 and the small-diameter outside peripheral surface 14.

A small concave groove 22 is formed proximate to the second end 34 of the small diameter outside peripheral surface 14 of the inner cylinder 6, and a C ring 23 is inserted through the outer cylinder 5 into the small concave groove 22. Inner cylinder 6 defines a threaded screw hole 24 which is adapted to receive a pull bolt as discussed herein below. Moreover, a ring-shaped concave groove 25, which is open towards the spindle shaft 1, is formed between the first end 30 of the inner cylinder 6 and the second end of the outer arm 8, and the elasticity-accelerating member 10 is inserted into the concave groove 25. The elasticity-accelerating member 10 consists of multiple disc springs 20, which are fitted in the inner cylinder 6 of the retainer 9 and contained in the concave groove 25.

Figure 2:
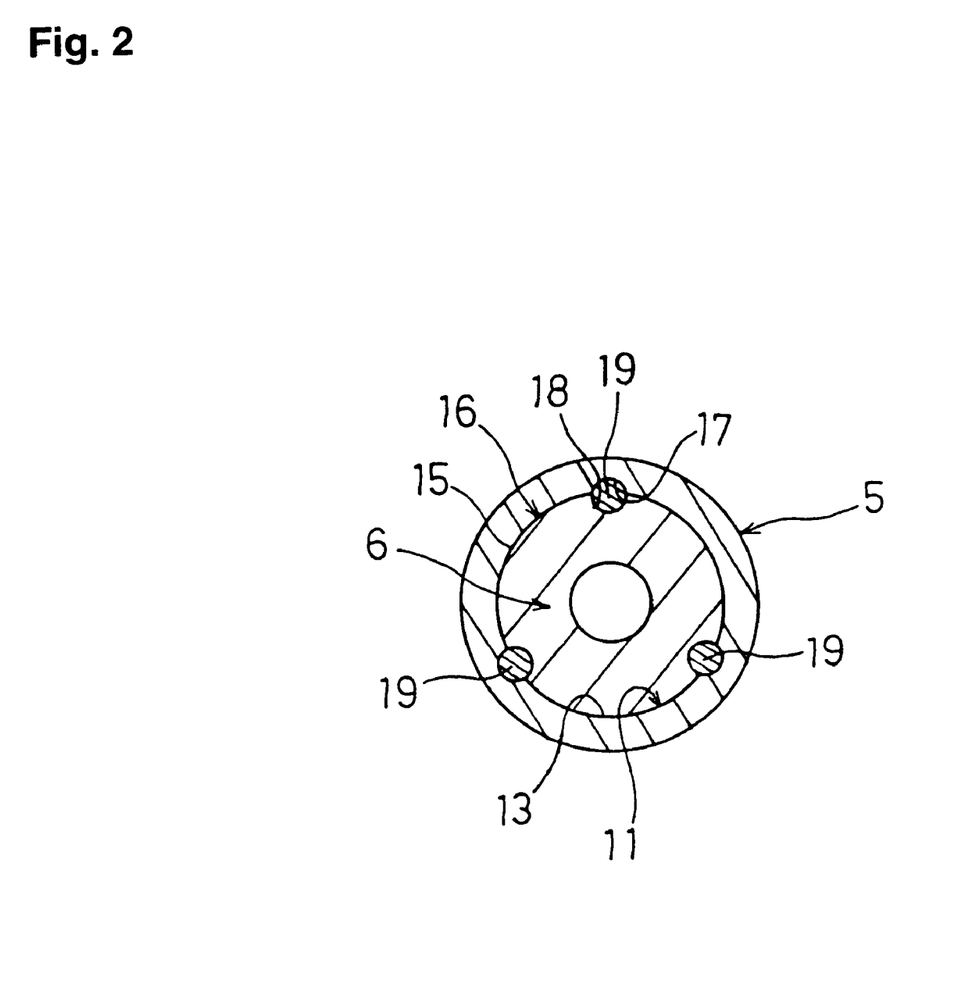
FIG. 2 is a plan view in section of a rotary tool holder.

The end of the large-diameter side of the outer cylinder 5 freely slides and enters the concave groove 25, and its pointed end contacts the disc spring 20. As shown in FIGS. 1 and 2, No. 1 or first concavity 17 and No. 2 or second concavity 18 are formed at a specified circumferential pitch and in such a manner that they oppose each other on the inside peripheral surface 11 of the outer cylinder 5 and the outside peripheral surface 16 of the inner cylinder 6 of the retainer 9, and rotation-stopping balls 19 are installed between the No. 1 or first concavity 17 and the No. 2 or second concavity 18. The No. 1 or first concavity 17 is formed as a longitudinal groove open towards the first end of said outer cylinder 5.

Figure 3:
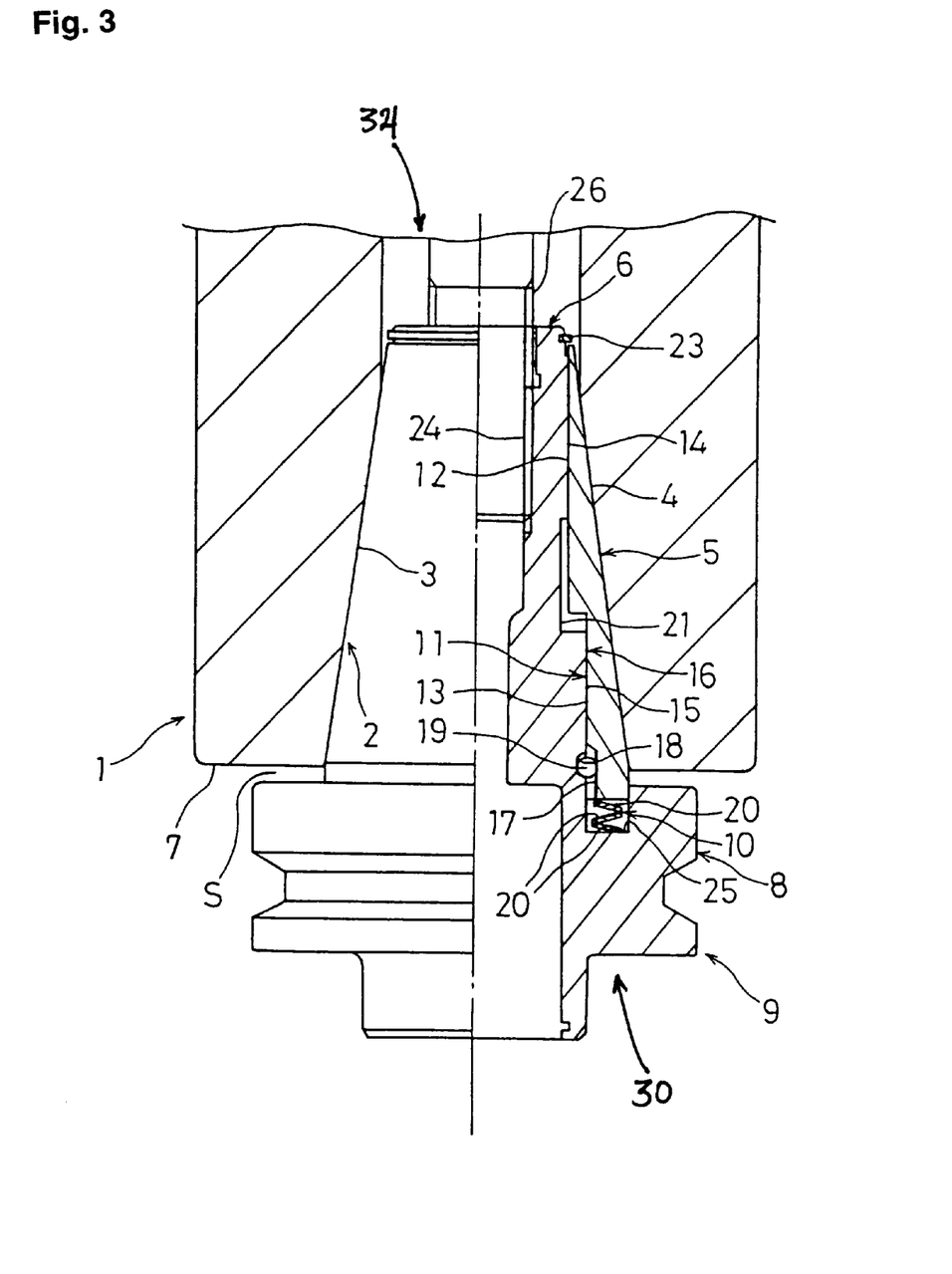
FIG. 3 is an illustration showing one method of installation.

The tool holder is attached to the spindle shaft 1, as shown in FIG. 3, by letting the inside peripheral surface 3 in the tapered hole 2 of the spindle shaft 1 contact the tapered outside peripheral surface 4 of the outer cylinder 5, and by letting the pull bolt 26 placed in the center of the spindle shaft 1 thread into the screw hole 24 in the inner cylinder 6 of the retainer 9. In this state however, a clearance S is created between the end surface 7 of the spindle shaft 1 and the outer armor 8.

Figure 4:
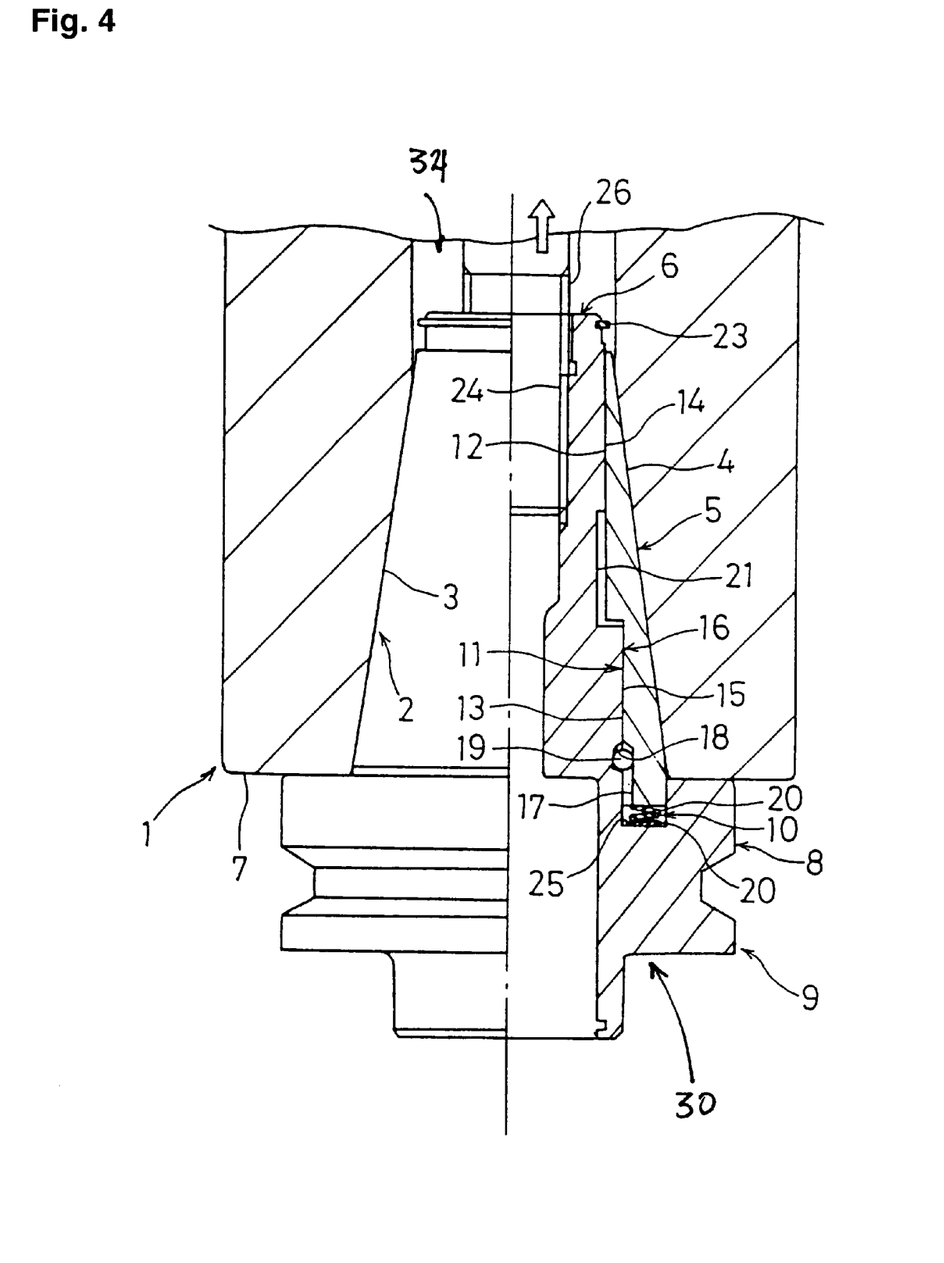
FIG. 4 is an illustration showing another method of installation.

As shown in FIG. 4, pulling the pull bolt 26 with sufficient force causes the retainer 9 to move towards the spindle shaft 1, while the outer cylinder 5 remains in its original position. By means of this process, disc springs 20 are compressed while accumulating elastic energy, causing the end of the spindle shaft 1 at the outer armor 8 of the retainer 9 to come into firm contact with the end surface 7 of the spindle shaft 1. At this time, the tapered outside peripheral surface 4 of the outer cylinder 5 is caused to strongly strike the inside peripheral surface 3 of the spindle shaft 1 by the elastic force of the compressed disc springs 20.

Thus, two-plane constraint can be realized due to the strong impact of the inside peripheral surface 3 of the spindle shaft 1 on the tapered outside peripheral surface 4 of the outer cylinder 5, and another strong impact of the top end 7 of the spindle shaft 1 on the outer armor 8. Furthermore, because the small-diameter inside peripheral surface 12 and the large-diameter inside peripheral surface 13 of the outer cylinder 5 contact the small-diameter outside peripheral surface 14, and the large-diameter outside peripheral surface 15 of the inner cylinder 6, respectively, the outer cylinder 5 and the inner cylinder 6 are held in an axially matched state. Thus, it is possible to perform ultra-precise cutting or grinding work under conditions of high rotation speed and rapid feeding. The rotary tool holder can be applied to existing machine tools (typically, machining centers and NC milling machines).

The condition 1.5 D≦L≦2.5 D is set in FIG. 1 because if L<1.5 D, the outer cylinder 5 is more likely to dislocate in the direction in which the shaft centers mutually incline against the spindle shaft 1. If 2.5 D<L, neither the installation accuracy nor the installation strength can be increased further. This condition simply results in wastage of material and an excessive increase in overall length and weight of the rotary tool holder. FIG. 2 shows an example using three rotation stopping balls 19. It is possible to decrease the number of rotation-stopping balls to two or increase it to four or more.

Figure 5:
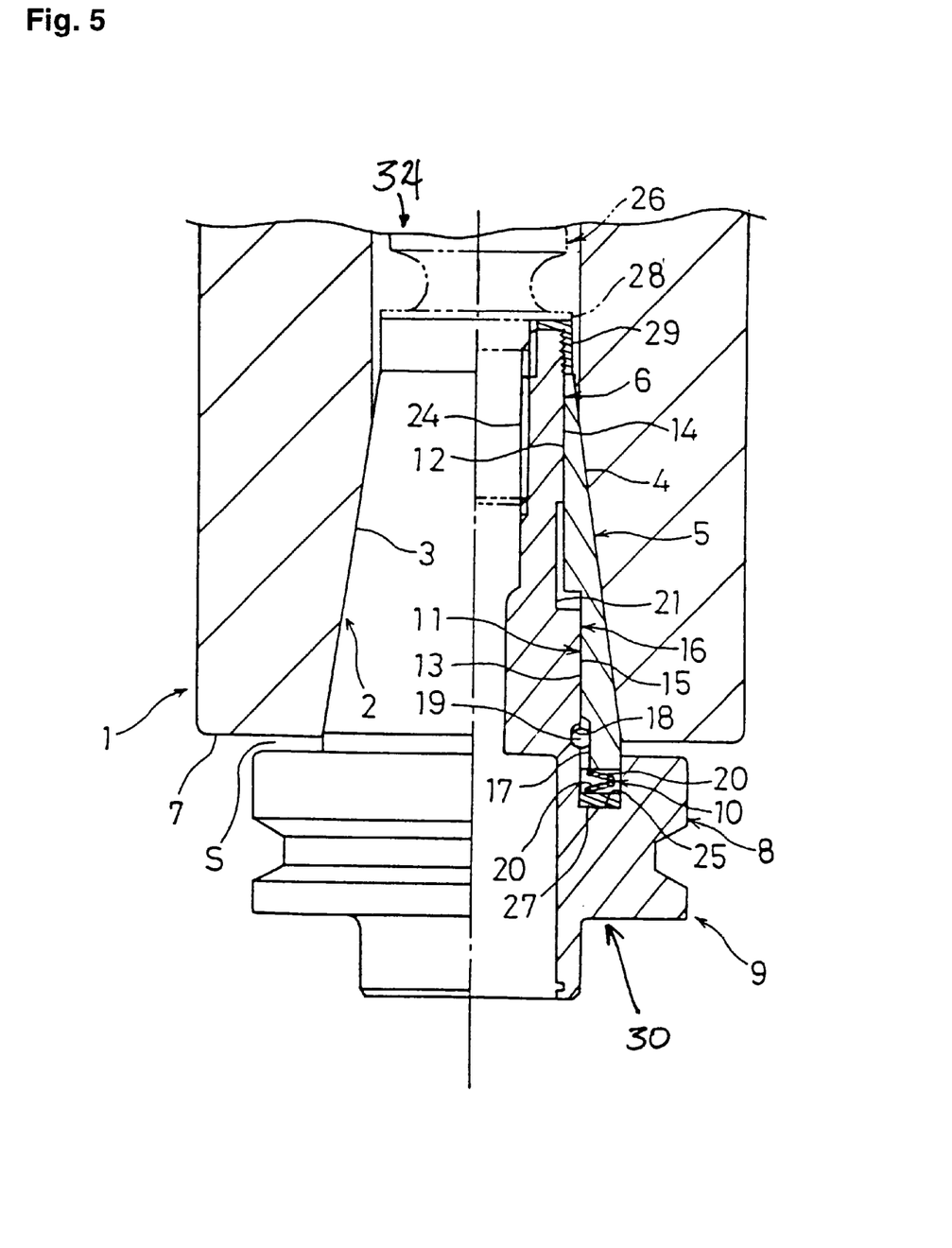
FIG. 5 is a horizontal sectional view showing another embodiment.

FIG. 5 shows a rotary tool holder in accordance with another embodiment of the present invention. Here, No. 1 or first spacer 27 is installed at the position where the elasticity-accelerating member 10 is accepted. In other words, the ring-shaped No. 1 or first spacer 27 is inserted, then, two disc springs 20 are also inserted into the concave groove 25 of the retainer 9. Moreover, a No. 2 or second spacer 29 with an inverted L-shaped cross section is fitted in the top end of the inner cylinder 6. It is desirable to provide threads on the inside peripheral surface of this No. 2 or second spacer 29 and threading it with part in the top end of the inner cylinder 6. By increasing or decreasing the thickness (in the axial direction) of said No. 1 or first and No. 2 or second spacers 27 and 29, the elastic force of disc spring 20 increases. Another advantage is that No. 2 or second spacer 29 can withstand the strong elastic power of the disc spring 20 at all times and will not fail. The pull bolt 26 has an outer armor 28 that contacts No. 2 or second spacer 29. Other components are the same as those shown in FIGS. 1 through 4.

The above configuration decreases the required number of disc springs 20 and increases their elastic force when the two planes are restrained by pulling the pull bolt 26 with sufficient force. The tapered outside peripheral surface 4 of the outer cylinder 5 therefore strikes the inside peripheral surface 3 of the spindle shaft 1 even more strongly, resulting in more powerful two-plane restraint.

Figure 6:
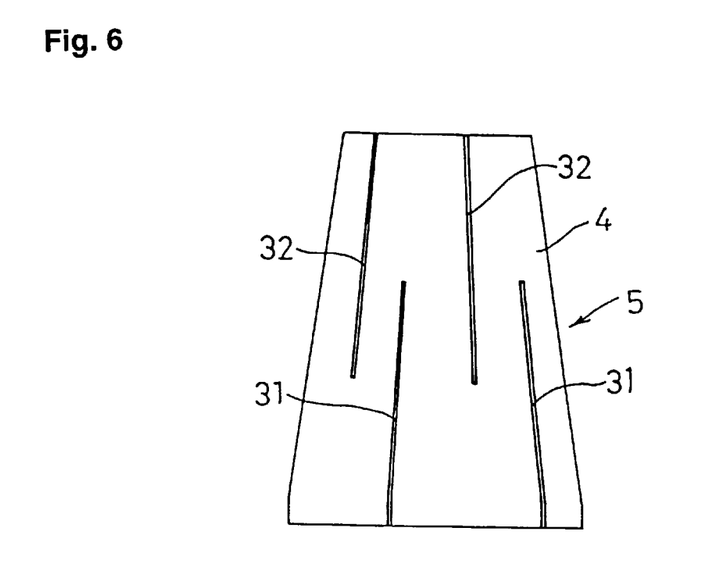
FIG. 6 is a front view showing an outer cylinder.

FIG. 6 shows another outer cylinder 5 with No. 1 or first longitudinal slits 31 and No. 2 or second longitudinal slits 32 that pass from the outside peripheral surface through the inside peripheral surface. To be more specific, No. 1 or first longitudinal slits 31, which penetrate from the end of the large-diameter side to the small-diameter side, which is a short distance from the midpoint section, and No. 2 or second longitudinal slits 32, which penetrate from the end of the small-diameter side to the large-diameter side, which is a short distance from the midpoint section, are provided at specified circumferential pitches. Such a configuration results, when the rotary tool holder is installed on the spindle shaft 1 (not illustrated), in improved contact between the tapered outside peripheral surface 4 of the outer cylinder 5 and the inside peripheral surface 3 of the tapered hole 2 of the spindle shaft 1 (not illustrated), as well as improved contact between the inside peripheral surface of the outer cylinder 5 and the outside peripheral surface of the inner cylinder 6, due to elastic deformation towards a smaller diameter. Furthermore, a vibration-isolating effect is obtained.

Figure 7:
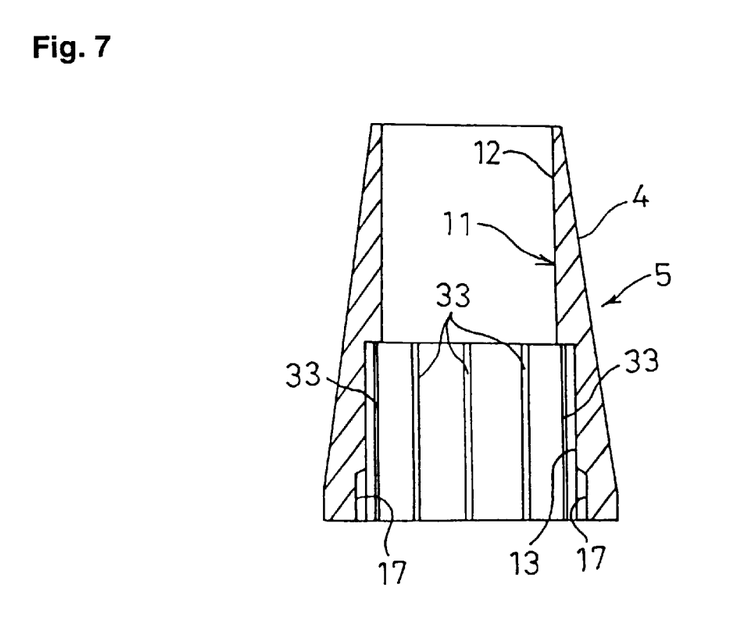
FIG. 7 is a front view showing another outer cylinder.

FIG. 7 shows another outer cylinder 5, with longitudinal grooves 33 provided at a specified circumferential pitch on the large-diameter inside peripheral surface 13 of the inside peripheral surface 11. As described previously, both the contact between the tapered outside peripheral surface 4 of the outer cylinder 5 and the inside peripheral surface 3 in the tapered hole 2 of the spindle shaft 1 (not illustrated), and that between the inside peripheral surface of the outer cylinder 5 and the outside peripheral surface of the inner cylinder 6, are improved. Furthermore, a vibration-isolating effect is obtained. It is desirable to form longitudinal grooves 33 on the small-diameter inside peripheral surface 12.

When the present invention is configured as mentioned above, it has the following effects.

For the rotary tool holder described with reference to FIG. 1, two-plane restraint can be realized because the inside peripheral surface 3 in the tapered hole 2 of the spindle shaft 1 comes into firm contract with the tapered outside peripheral surface 4 of the outer cylinder 5, and the top end 7 of the spindle shaft 1 comes into firm contact with the outer armor 8. As a result, it is possible to perform ultra-precise cutting or grinding work under conditions of high rotation speed and rapid feeding. Additionally, as dislocation in the direction in which the centers of the outer cylinder 5 and the spindle shaft 1 mutually incline decreases, the overall length and weight of the rotary tool holder become reasonable.

Further, by using multiple disc springs 20, the structure becomes simpler and the elastic force with which the outer cylinder 5 is pushed against the inside peripheral surface 3 in the tapered hole 2 of the spindle shaft 1 increases, resulting in more powerful two-plane restraint. Additionally, the centers of the outer cylinder 5 and the inner cylinder 6 dislocate less towards the direction of mutual inclination.

In the rotary tool holder described with reference to FIG. 2, mutual rotation (free rotation) of the outer cylinder 5 and the retainer 9 (the inner cylinder 6) can be prevented.

In the rotary tool holder described above with reference to FIG. 5, replacement of No. 1 or first spacer 27 and No. 2 or second spacer 29 by parts with different thickness (in the axial direction) can allow precise adjustment of the elastic force of the elasticity-accelerating member 10.

Moreover, the L-shaped No. 2 or second spacer 29 with an inverted-L-shaped cross section securely accepts and holds the top end of the outer cylinder 5, preventing it from coming out.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A rotary tool holder comprising:
   an outer cylinder having an inside peripheral surface, and a tapered outside peripheral surface which comes into contact in a tapered hole with an inside peripheral surface of a spindle shaft;
   an inner cylinder, having an outside peripheral surface, which fits in such a manner that said outer cylinder can slide in an axial direction;
   a flange which is formed at a first end of said inner cylinder and configured to contact the first end of said spindle shaft;
   an elasticity-accelerating member which imparts elastic force to said flange when said flange is in contact with said first end of said spindle shaft so that said outer cylinder moves towards a second end of said spindle shaft;
   a first concavity and a second concavity formed at a specified circumferential pitch such that they oppose each other on said inside peripheral surface of said outer cylinder and said outside peripheral surface of said inner cylinder; and
   rotation-stopping balls installed between said first concavity and said second concavity.

2. A rotary tool holder as set forth in claim 1, wherein said inside peripheral surface of said outer cylinder comprises:
   a small-diameter inside peripheral surface;
   a large-diameter inside peripheral surface.

3. A rotary tool holder as set forth in claim 2, wherein said flange comprises:
   a small-diameter outside peripheral surface; and
   a large-diameter outside peripheral surface formed in said flange, such that said small-diameter outside peripheral surface contacts said small-diameter inside peripheral surface and said large diameter outside peripheral surface contacts said large-diameter inside peripheral surface such that the flange freely slides in an axial direction.

4. A rotary tool holder as set forth in claim 1, wherein said outer cylinder has a maximum diameter D and an axial length L, the maximum diameter D and the axial length L being defined by $1.5\,D \leq L \leq 2.5\,D$.

5. A rotary tool holder as set forth in claim 1, wherein said elasticity-accelerating member comprises multiple disc springs, said disc springs fitted in said inner cylinder.

6. A rotary tool holder as set forth in claim 2, wherein said outer cylinder further comprises:
   first longitudinal slits passing from the outside peripheral surface through the inside peripheral surface extending inwardly along the length of said large-diameter inside peripheral surface; and
   second longitudinal slits passing from the outside peripheral surface through the inside peripheral surface extending inwardly along the length of said small-diameter inside peripheral surface.

7. A rotary tool holder as set forth in claim 2, wherein said outer cylinder further comprises longitudinal grooves on the large-diameter inside peripheral surface.

8. A rotary tool holder comprising:
   an outer cylinder having an inside peripheral surface, and a tapered outside peripheral surface which comes into contact in a tapered hole with an inside peripheral surface of a spindle shaft;
   an inner cylinder, having an outside peripheral surface, which fits in such a manner that said outer cylinder can slide in an axial direction;
   a flange which is formed at a first end of said inner cylinder and configured to contact the first end of said spindle shaft;
   an elasticity-accelerating member which imparts elastic force to said flange when said flange is in contact with said first end of said spindle shaft so that said outer cylinder moves towards a second end of said spindle shaft;
   a ring-shaped first spacer installed at a position where said elasticity-accelerating member is accepted; and
   a second spacer having an inverted-L-shaped cross section fitted at a second end of said inner cylinder.

9. A rotary tool holder as set forth in claim 8, wherein said inside peripheral surface of said outer cylinder comprises:
   a small-diameter inside peripheral surface;
   a large-diameter inside peripheral surface;

a first concavity and a second concavity formed at a specified circumferential pitch such that they oppose each other on said inside peripheral surface of said outer cylinder and said outside peripheral surface of said inner cylinder; and rotation-stopping balls installed between said first concavity and said second concavity.

10. A rotary tool holder as set forth in claim 9, wherein said flange comprises:

a small-diameter outside peripheral surface; and a large-diameter outside peripheral surface formed in said flange, such that said small-diameter outside peripheral surface contacts said small-diameter inside peripheral surface and said large diameter outside peripheral surface contacts said large-diameter inside peripheral surface such that the flange freely slides in an axial direction.

11. A rotary tool holder as set forth in claim 8, wherein said outer cylinder has a maximum diameter D and an axial length L, the maximum diameter D and the axial length L being defined by $1.5\ D \leq L \leq 2.5\ D$.

12. A rotary tool holder as set forth in claim 8, wherein said elasticity-accelerating member comprises multiple disc springs, said disc springs fitted in said inner cylinder.

13. A rotary tool holder as set forth in claim 9, wherein said outer cylinder further comprises:

first longitudinal slits passing from the outside peripheral surface through the inside peripheral surface extending inwardly along the length of said large-diameter inside peripheral surface; and second longitudinal slits passing from the outside peripheral surface through the inside peripheral surface extending inwardly along the length of said small-diameter inside peripheral surface.

14. A rotary tool holder as set forth in claim 9, wherein said outer cylinder further comprises longitudinal grooves on the large-diameter inside peripheral surface.

15. A rotary tool holder comprising:

an outer cylinder having an inside peripheral surface with a small-diameter inside peripheral surface and a large-diameter inside peripheral surface, and a tapered outside peripheral surface which comes into contact in a tapered hole with an inside peripheral surface of a spindle shaft, said outer cylinder having first longitudinal slits passing from the outside peripheral surface through the inside peripheral surface extending inwardly along the length of said large-diameter inside peripheral surface, and second longitudinal slits passing from the outside peripheral surface through the inside peripheral surface extending inwardly along the length of said small-diameter inside peripheral surface;

an inner cylinder, having an outside peripheral surface, which fits in such a manner that said outer cylinder can slide in an axial direction;

a flange which is formed at a first end of said inner cylinder and configured to contact the first end of said spindle shaft; and an elasticity-accelerating member which imparts elastic force to said flange when said flange is in contact with said first end of said spindle shaft so that said outer cylinder moves towards a second end of said spindle shaft.

16. A rotary tool holder comprising:

an outer cylinder having an inside peripheral surface with a small-diameter inside peripheral surface and a large-diameter inside peripheral surface, and a tapered outside peripheral surface which comes into contact in a tapered hole with an inside peripheral surface of a spindle shaft, said outer cylinder having longitudinal grooves on the large-diameter inside peripheral surface;

an inner cylinder, having an outside peripheral surface, which fits in such a manner that said outer cylinder can slide in an axial direction;

a flange which is formed at a first end of said inner cylinder and configured to contact the first end of said spindle shaft; and an elasticity-accelerating member which imparts elastic force to said flange when said flange is in contact with said first end of said spindle shaft so that said outer cylinder moves towards a second end of said spindle shaft.

* * * * *

UNITED STATES PATENT AND TRADEMARK OFFICE
CERTIFICATE OF CORRECTION

PATENT NO. : 5,964,556
DATED : October 12, 1999
INVENTOR(S) : Hiromitsu Toyomoto Page 1 of 1

It is certified that error appears in the above-identified patent and that said Letters Patent is hereby corrected as shown below:

<u>Title page,</u>
Insert the Foreign Application Priority Data as follows:
-- Jun. 19, 1997 [JP]  Japan..............................9-180645 --.

Signed and Sealed this

Ninth Day of October, 2001

Attest:

*Nicholas P. Godici*

NICHOLAS P. GODICI
*Attesting Officer*  *Acting Director of the United States Patent and Trademark Office*